United States Patent [19]

Thomas et al.

[11] Patent Number: 4,980,262
[45] Date of Patent: Dec. 25, 1990

[54] PRODUCING A REPLICATE VIDEO DISC BY A METHOD OF PHOTOGRAPHIC CONTACT PRINTING

[75] Inventors: Harold T. Thomas, Rochester; Dennis G. Howe, Fairport, both of N.Y.

[73] Assignee: Eastman Kodak Company, Rochester, N.Y.

[21] Appl. No.: 71,593

[22] Filed: Aug. 29, 1979

Related U.S. Application Data

[60] Division of Ser. No. 891,865, Mar. 30, 1978, abandoned, which is a continuation of Ser. No. 715,017, Aug. 16, 1976, abandoned.

[51] Int. Cl.$^5$ .................. G03C 5/34; G03C 5/18; G03C 5/00; G01D 9/00
[52] U.S. Cl. .................. 430/141; 346/1.1; 346/76 L; 346/135.1; 358/310; 358/345; 358/347; 365/106; 365/120; 365/127; 365/146; 369/100; 369/109; 369/111; 369/112; 369/125; 369/275.1; 369/277; 369/284; 369/285; 430/1; 430/5; 430/8; 430/11; 430/17; 430/23; 430/146; 430/148; 430/269; 430/321; 430/332; 430/334; 430/367; 430/390; 430/393; 430/395; 430/396; 430/495; 430/945; 355/79; 355/132
[58] Field of Search .................. 430/1, 5, 11, 8, 17, 430/23, 141, 146, 148, 332, 334, 367, 395, 396, 390, 393, 269, 321, 495; 358/4, 6, 7, 127, 128, 129, 130, 340, 345, 347; 179/100.3 R, 100.3 A, 100.3 G, 100.3 K, 100.3 V; 346/1.1, 150, 151, 153, 159, 135.1, 76 L; 365/106, 120, 127, 140; 355/79, 132; 369/100, 109, 111, 112, 277, 287, 285

[56] References Cited

U.S. PATENT DOCUMENTS 3,665,483  5/1972  Beckov et al. ............... 346/76 L
3,838,401  9/1974  Graf et al. ................... 346/77 R
4,023,185  5/1977  Bloom et al. ............... 346/135.1
4,032,691  6/1977  Kido et al. ................... 428/304
4,152,156  5/1979  Voisin et al. ................. 430/152

OTHER PUBLICATIONS

Bouwhuis et al., "Principles of Optical Disc Systems", Adam Hilger Ltd., 1985, pp. 1-4 relied on.
Berg, A., et al., J. of SMPTE, vol. 83, No. 7, pp. 588-599, 7/1974.
Bartolini, R. A., et al., Optical Enginerring, vol. 15, No. 2, pp. 99-108, 3-4/1976.

Primary Examiner—Charles L. Bowers, Jr.
Attorney, Agent, or Firm—J. Jeffrey Hawley

[57] ABSTRACT

A photographic contact printing process is disclosed having application in the mass production of replicate video discs from a master disc, and other applications wherein it is desired to replicate micro-detail over a relatively large area. A problem with conventional contact printing from a mask to a photographic medium is one of maintaining intimate contact over a relatively large area since dust, dirt, etc., are almost impossible to completely eliminate in any practical manner. In accordance with the present invention, a contact printing process is provided wherein intimate contact is not necessary for making high quality contact prints. The present invention recognizes that in contact printing information from a master disc to a replicate disc, the contact printing process is significantly less sensitive to imperfect contact between the master disc and the replicate disc if one employs a replicate disc comprising a photosensitive material having a certain optical properties. In particular, the photosensitive material initially has a high level of absorption to the actinic radiation used for exposure but, under the influence of such actinic radiation, the absorption decays to a lower level during exposure.

8 Claims, 4 Drawing Sheets

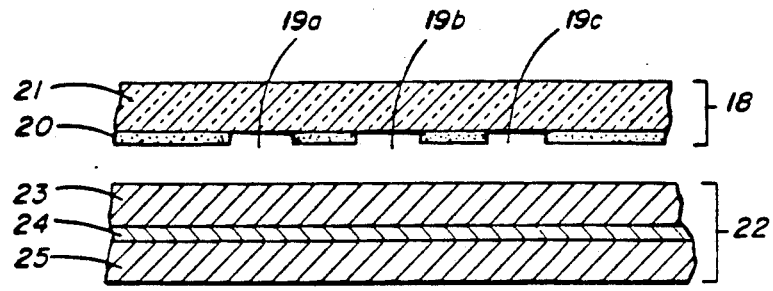
FIG. 1
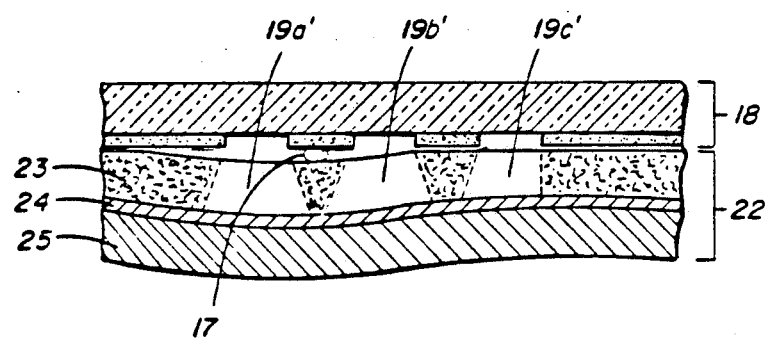
FIG. 2
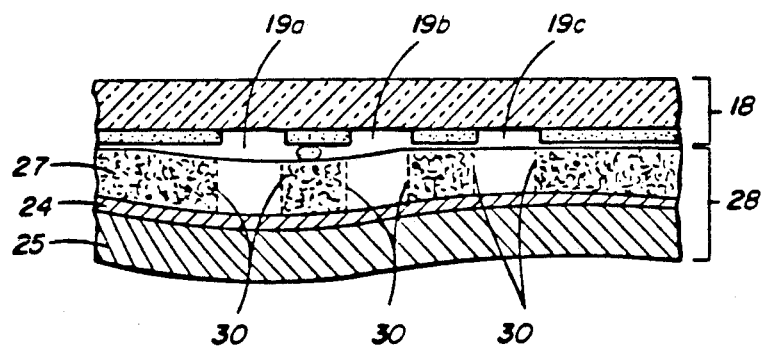
FIG. 6
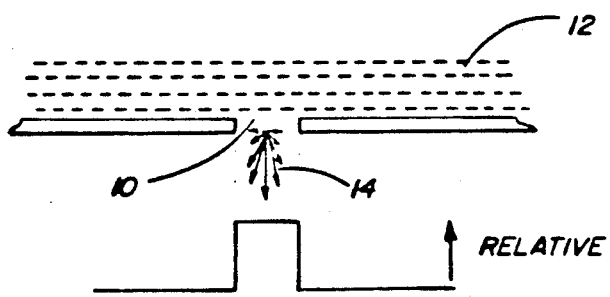
FIG. 3a
FIG. 3b
TRANSMISSION PROFILE
RELATIVE TRANSMISSION

PRODUCING A REPLICATE VIDEO DISC BY A METHOD OF PHOTOGRAPHIC CONTACT PRINTING

This is a division of application Ser. No. 891,865 filed Mar. 30, 1978 (now abandoned) which is a continuation of application Ser. No. 715,017 filed Aug. 16, 1976 (now abandoned).

BACKGROUND OF THE INVENTION

1. Field of the Invention

The present invention relates to video discs and to a method for mass producing replicate video discs from a master video disc, and more particularly to a mass production process wherein the replicate discs are contact prints of the master disc.

2. Description Relative to the Prior Art

A master video disc is a high quality recording of video program material. From the master disc, it is desirable to mass produce replicate discs for consumer use. The replicate discs should therefore be priced for the consumer market; price being a function of the cost of materials to manufacture the replicate discs as well as the cost of the replicating process itself. One very attractive duplicating process is that of contact printing. Contact printing is inexpensive, straightforward and reliable when it works. Unfortunately, contact printing is not well suited to the replication of video discs for two major reasons: (1) Video information recorded on a video disc is in the form of an array of elongated circular apertures only a few wavelengths of light in size; diffraction by such apertures causes contact between the master disc and the replicate disc to be extremely critical. Even a slight separation occurring between the master disc and the replicate disc during exposure will result in a large drop in the fidelity of the recorded micro-imagery. (2) The typical video disc is about 30 cm (twelve inches) in diameter and has literally billions of micrometer sized apertures covering the disc, thereby making it necessary to maintain intimate master-to-replicate contact over the entire disc surface—a very difficult, if not impossible, requirement.

Over a 30 cm disc surface it is almost a certainty that intimate contact will be lost over substantial areas due to the presence of dust, dirt, etc. Loss of intimate contact between the master disc and the replicate disc is accompanied by a decrease in the quality of the replicate image which, at best, results in poor video information transfer and, in the more severe instances, results in complete loss of the video signal. It would, therefore, seem apparent that if contact printing is to be a viable method of mass producing replicate video discs from a master disc, the critical problem of achieving intimate contact and maintaining such contact over the entire disc surface would have to be solved. As a corollary to the intimate-contact problem, it will be appreciated that a protective coating on the master would severely degrade contact printed images.

SUMMARY OF THE INVENTION

The present invention provides a method for obtaining replicate discs from a master disc by a contact printing process wherein no extraordinary measures are taken to insure intimate contact between the master disc and the replicate disc. Indeed, intimate contact is not required, yet the replicate discs thus produced are of high quality. Such a result is achieved, not by eliminating less than perfect contact between the master disc and the replicate disc, but rather by controlling the effects of such imperfect contact on image quality. The invention recognizes that in contact printing information from a master disc to a replicate disc, the contact printing process is significantly less sensitive to imperfect contact between the master disc and the replicate disc if one employs a replicate disc comprising a photosensitive layer having certain optical properties. In particular, in accordance with the invention, the photosensitive layer must initially have a relatively high level of absorption to the actinic radiation used for exposure but, under the influence of the actinic radiation, the absorption decays to a lower level during exposure. Using such a photosensitive medium results in a contact print of high quality even though there may be less than perfect contact between the master disc and the replicate disc or even if a spacing layer such as a master overcoat is used to separate the master surface from the replicate surface. Why this result should occur will be discussed below in connection with the drawings.

BRIEF DESCRIPTION OF THE DRAWINGS

In accordance with one embodiment of the present invention, a method of producing a replicate video record from a master video record is provided, said master video record having video information encoded thereon in the form of transparent apertures, said method comprising the steps of:

superposing said master video record and a replicate video record material, said replicate video record material comprising a photosensitive material having a relatively high level of absorption to actinic radiation, which level of absorption decreases to a lower level upon exposure to said actinic radiation; and exposing said replicate video record material through said transparent apertures in said master disc with said actinic radiation.

Figure 4:
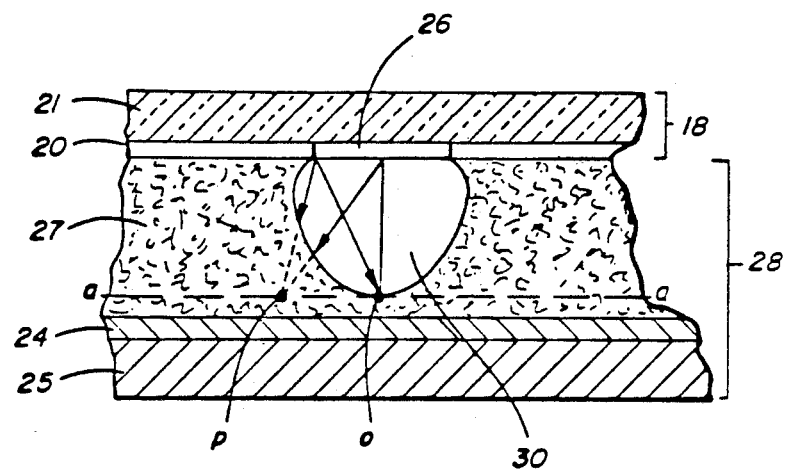
Figure 7:
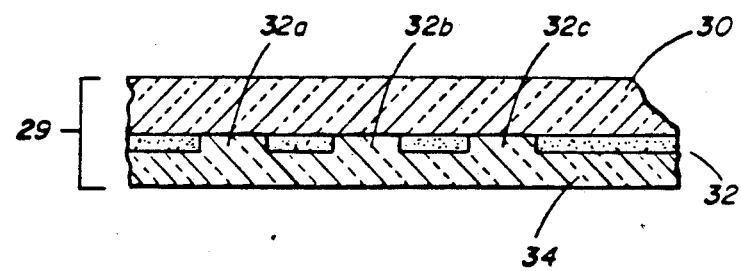
Figure 5A:
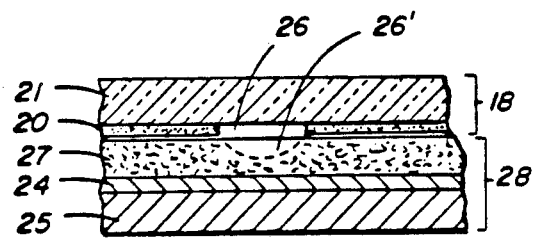

In the detailed description of the preferred embodiments of the invention presented below, reference is made to the accompanying drawings, in which:

FIG. 1 shows a cross-sectional view of a master disc and a replicate disc ready for contact printing;

FIG. 2 shows the result, absent the invention, of contact printing the master disc onto a replicate disc;

FIGS. 3a and 3b show the behavior of radiation upon passage through an aperture;

FIGS. 4 and 5a, b, and c illustrate qualitatively the contact printing process as taught by the present invention;

FIG. 6 is a qualitative representation of the result of a contact printing process embodying the present invention, and FIG. 7 shows an overcoated master.

DESCRIPTION OF THE PREFERRED EMBODIMENTS

FIG. 1 shows a master video disc 18 comprising a glass substrate 21 having a thin layer of metal 20, e.g. bismuth, coated thereon. A series of apertures 19a, b, and c in the thin metal layer 20 represent video information contained both in the size and the spacing of such apertures. Typically, the apertures 19 are less than 1 $\mu$m ($\mu$m=micrometer) wide and less than 2 $\mu$m in length. Since the production of a master disc 18 is a relatively expensive process, it is desirable to mass produce a large number of replicate discs from the master disc 18. One form of a replicate video disc 22 comprises a layer 23 of positive photosensitive material that forms a density image coated on a reflective layer 24, say of aluminum, both layers being supported by a flexible plastic substrate 25. It will be apparent to those skilled in the art that the replicate disc 22 just described is merely one form of replicate video disc, many forms being possible depending upon the properties of the particular apparatus employed for playback. It is desired to form apertures in the positive photosensitive layer 23 corresponding in size and shape to the apertures 19 on the master disc 18. Any distortion in aperture size, shape or spacing leads to a distorted or noisy video signal upon playback of the replicate disc 22.

FIG. 2 shows an attempt, absent the invention, to contact print the master disc 18 onto the replicate disc 22. The contact condition between the master and replica discs in the vicinity of the apertures 19a, b and c illustrates a common contact printing problem. At apertures 19a and 19b, loss of intimate contact due to a foreign object 17 such as a speck of dust or dirt is illustrated. Foreign object 17 might also be a localized imperfection in the coated photosensitive layer 23 that serves to increase the effective thickness of the layer 23 in the vicinity of the apertures 19. Foreign object 17 could also be a localized surface defect on the master 18. At aperture 19c, the ideal, but often not realized, condition of intimate contact between the photosensitive layer 23 and the thin metal layer 20 is shown.

When illuminated by collimated monochomatic radiation, each of the apertures 19 gives rise to diffraction which causes the radiation passing there-through to fan-out. Aerial images of the apertures 19 formed by the diffracted radiation in the near field (i.e., in the image space directly beneath the apertures 19) contain increasing amounts of unwanted structure (fringing) and geometrical distortion as the distance from the apertures to such image planes becomes greater than a few wavelengths of the exposing radiation. In practical situations, the exposing radiation has appreciable spectral extent so that the interference related image structure (fringing) tends to even out, but the geometrical distortion degradation of the image remains. Thus, exposure of the positive photosensitive layer 23 by radiation passing through the apertures 19a and 19b (where intimate contact has been lost) results in the degraded (distorted) images 19a' and 19b' in the photosensitive layer 23. The imagewise exposure made through aperture 19c is of higher fidelity, (has less distortion) due to the intimate contact between the thin metal layer 20 and the photosensitive layer 23, such contact giving the near field diffracted image less distance in which to degrade.

While it would appear that the solution to the problem would be to eliminate foreign objects such as foreign object 17 and to eliminate surface imperfections on the photosensitive layer 23 and master 18, a deeper understanding of the problem leads to a different and preferable solution. FIG. 3a shows an aperture 10 (similar to the apertures 19 discussed above) having a transmission profile as shown in FIG. 3b. As a plane collimated wave of heterochromatic radiation 12 passes through the aperture 10 a near field diffraction image is produced, the spatial irradiance distribution of which depends upon the distance from the aperture 10. The lengths of the arrows 14 in FIG. 3a qualitatively represent the relative flux and direction of diffracted radiation at the aperture 10. It is seen that while maximum radiation occurs in the forward direction, considerable radiation is directed laterally. Upon contact printing both images 19a' and 19b' are distorted by the spreading of the diffracted exposing radiation, i.e., diffracted radiation impinging on image planes that occur at increasingly greater depths throughout the volume of the imaging layer gives rise to the increasingly distorted aperture images 19a' and 19b' discussed above. The present invention recognizes that if one could confine the diffracted radiation in such a way that the angular distribution of the near field diffracted radiation that reaches any particular image plane is made sufficiently narrow, the occurrence of unwanted image distortion would be minimized, and the contact printing process (described in connection with FIG. 2) would be significantly less sensitive to losses in intimate contact between the master disc 18 and the replicate disc 22 (or alternatively that thicker layers of photosensitive material could be used if intimate contact is maintained).

FIG. 4 qualitatively illustrates the workings of the present invention showing the contact printing of a single aperture 26. The master disc 18 and the replicate disc 28 appear similar to those discussed above. The replicate disc 28, however, comprises a photosensitive layer 27 having certain optical properties which, in effect, control the diffracted, laterally diverging exposing radiation discussed above. Specifically, the photosensitive layer 27 initially has a high absorption to the wavelength (or wavelengths) of radiation used for exposure in the contact printing process; but as exposure takes place, the absorption decays to a lower level during exposure in proportion to the amount of radiation absorbed. In effect, therefore, radiation diffracted at large angles by aperture 26 is confined via absorption to the upper surface portion of the photosensitive layer and does not contribute to degradation of the imagewise exposure of planar regions in the photosensitive layer that are at greater depths in the photosensitive layer. Thus, for example, in FIG. 4, which depicts the contact printing process at some intermediate stage such that full exposure of the photosensitive layer 27 has not yet been accomplished—but such that a volume 50 of the photosensitive layer 27 lying beneath aperture 26 has been exposed and rendered transparent to further exposing radiation—point "0" lying directly beneath aperture 26 on plane "a" interior to layer 27 can be exposed while point "p" which lies outside of the geometrical shadow of aperture 26 on plane "a" cannot be exposed at this time. Exposure will continue until the bottom plane of the photosensitive layer 27 that is coincident with the top surface of reflective layer 24 becomes transparent over an area that is centered beneath aperture 26 and has the same size and shape as aperture 26. Moreover, since a given planar area of photosensitive medium cannot be exposed until the region of the medium lying above it is exposed to render it transparent, radiation reflected from the reflective layer beneath the photosensitive material cannot affect the imagewise exposure unless severe overexposure conditions are encountered, i.e., unless exposure is carried so far that radiation diffracted at relatively large angles by the aperture 26 can reach the reflective layer beneath the photosensitive medium.

It has been found through experimentation that use of a photosensitive layer 27 having the described optical properties leads to a contact printing process significantly less sensitive to losses in contact between the master disc 18 and the replicate disc 28; and also that thicker photosensitive layers that ultimately have higher transmission contrast between exposed and nonexposed regions can be used.

Figure 5B:
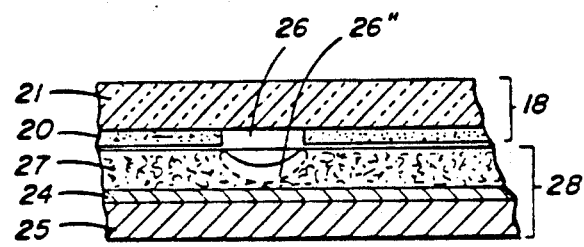
Figure 5C:
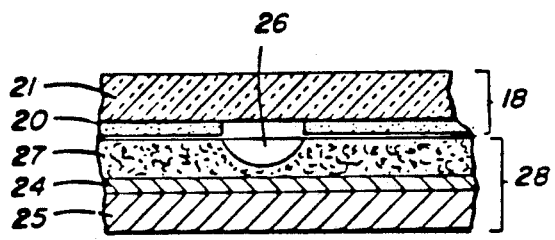
Figure 5A:
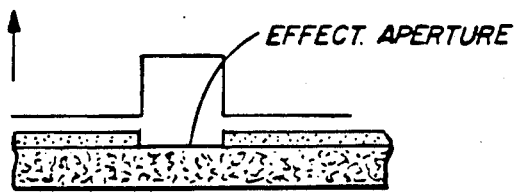
Figure 5B:
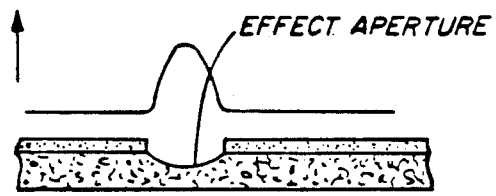
Figure 5C:
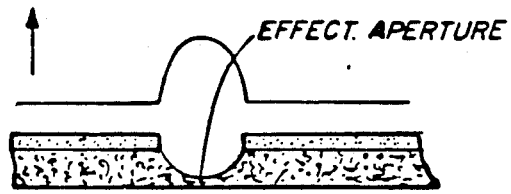

FIGS. 5a, b and c represent the contact printing process in time sequence and serve to offer further explanation for more subtle beneficial workings of the invention. Initially, the master disc 18 is placed in contact with the replicate disc 28. Upon exposure, the first group of photons transmitted to the surface of the unexposed imaging layer 27 via the aperture 26 "see" a transmission profile as shown in FIG. 5a'. As discussed in connection with FIGS. 3a and 3b, such an aperture causes diffraction having an angular intensity distribution shown qualitatively by arrows 14 in FIG. 3a. Due to the above described optical properties of the photosensitive layer 27, however, a portion of the photosensitive layer 27 directly under and centered on the aperture 26 (defined by the dotted line 26') becomes transparent, the exact shape of the transparent portion of the photosensitive layer 27 being determined by the angular intensity distribution of radiation (see FIG. 4). The second group of photons transmitted to unexposed regions in the volume (beneath the surface) of the imaging layer 27 do not, therefore, see the transmission profile of FIG. 5a', but rather see a transmission profile determined both by the aperture 26 and by the transparent portion 26' near the top surface of the photosensitive layer 27 (see FIG. 5b). The transmission profile of the effective aperture is shown in FIG. 5b' and, importantly, contains no sharp edges or corners. It is well known in optics that radiation is diffracted at large angles by sharp edges. The transmission profile of FIG. 5b' can be expected, therefore, to cause diffraction that is confined to a narrower solid angle than diffraction caused by the transmission profile of FIG. 5a'. The net effect is that of directing more radiation in the forward direction and less radiation in the lateral directions. Similar to the first group of photons, the second group of photons causes a portion of the photosensitive layer 27, defined by the dotted line 26'' in FIG. 5b to become transparent. As shown in FIG. 5c, the third group of photons sees an effective aperture comprising the aperture 26 and the transparent portion 26'' of the photosensitive layer 27. Again, due to the shape of the resultant transmission profile (FIG. 5c') there is diminished diffraction in the lateral direction.

Thus, the effective aperture formed in the photosensitive layer 27 and seen by successive groups of photons evolves in time and, as a result of such evolution, each successive group of photons sees an effective aperture having a transmission profile lacking sharp edges and corners. The elimination of sharp edges and corners, as discussed, results in less diffraction in the lateral directions. This, of course, further confines the lateral extent of the volume of the photosensitive layer which is rendered transparent to a region immediately below the master aperture 26. The end result is an image, in the photosensitive layer 27, of the aperture 26 having significantly less distortion than that which would be obtained were the photosensitive layer 27 not to possess the optical properties defined by the invention.

FIG. 6 shows the identical setup of FIG. 2 with the sole exception that the layer of photosensitive material 23 has been replaced by a photosensitive layer 27 having optical properties in accordance with the present invention. The results of the contact printing operation are qualitatively represented by the dotted lines 30. It is seen that even where intimate contact is lost (around apertures 19a and 19b) the resulting image in the photosensitive layer 27 does not have the distorted shape shown in FIG. 2. While less than perfect contact still exists, the effects of such imperfect contact have been minimized thereby permitting replicate video discs to be mass produced from a master video disc by contact printing.

As a practical matter, since the replicate video disc is for consumer use, a photosensitive material is needed at a reasonable cost having optical properties in accordance with the present invention. One such material having these optical properties is a diazo film layer. The diazo layer contains a diazonium salt which is highly absorptive of radiation in the 400 nm range (blue light) and a coupler which absorbs at shorter wavelengths. Each diazonium salt molecule, however, is photolyzed by light of this wavelength to give material which does not absorb in this range. Once the particular diazonium salt molecule has absorbed a photon and decomposed, it is, in effect, rendered transparent to other photons. Those portions of the diazo layer which are exposed with radiation of a relatively high irradiance therefore become transparent to the exposing radiation at a relatively rapid rate. On the other hand, portions of the diazo layer which receive low irradiance levels become transparent at a proportionately slower rate. On a macro-level the diazo layer appears yellow to the eye (blue light is absorbed) before exposure to actinic radiation. Those portions of the diazo layer exposed to actinic radiation (blue light) become transparent to such radiation, thereby producing the angular confinement of diffracted light and the evolving aperture effect of the present invention. In the case of a diazo layer, processing by exposure to ammonia (or other base) produces a sharp increase in the visual contrast between the unexposed yellow areas and the exposed transparent areas by causing unexposed diazonium salt molecules and couplers to react and form a relatively dense visual dye. For example, the visual dye may be one which absorbs strongly at the 633 nanometer He-Ne laser line.

Other photographic systems which would possess the desired optical printing characteristics include dye bleach and photochromic systems. Both offer almost arbitrarily high initial absorbance in the wavelength region at which they are sensitive. In the dye bleach type systems, photo-generated excited species are bleached by added materials, e.g. 1-allyl-2-thiourea, to give products transparent in the initially absorbing wavelength region. Photochromic systems photoisomerize upon exposure to products absorbing in a different spectral region from the starting material.

An inherent property of the above-described photosensitive material (a material that before exposure to actinic radiation has a relatively high level of absorption to such actinic radiation, but which level of absorption decreases to a lower level during exposure to such actinic radiation) is that the photosensitive material is positive-working during exposure to actinic radiation, i.e., regions where actinic radiation impinges upon the material become more transparent.

As stated above, a master for use in video disc replicating typically employs a thin bismuth coating on a support, the coating containing a distribution of tiny laser-machined holes. Such a layer is susceptible to damage when pressed in intimate contact with a replicate video disc during the contact printing process. Trapped dust or dirt may scratch the layer; also, the mere rubbing of the two discs can cause pick-off, i.e., the bismuth layer peels off its substrate. It is apparent, therefore, that conventional master video discs are not well suited for high volume contact printing applications.

By virtue of the present invention, a master whether a bismuth coated one or otherwise, may be provided with a protective overcoat, thereby preventing the intimate contact which the prior art has found so necessary. Referring to FIG. 7, a master video disc 29 comprises a substrate 60 having an image bearing layer 32 coated thereon. The size and spacing of apertures, such as apertures 33a,b and c define the video information content of the image bearing layer 32. The image bearing layer 32 may assume various forms, one of which is the laser machined bismuth layer discussed above. Coated over the image bearing layer 32 is a surface layer 34. The surface layer 34 is relatively thin, less than a micron in thickness, yet comprised of a durable material able to withstand the harsh environment encountered in the contact printing process. The thickness of the surface layer 34 depends upon the particular application, some applications requiring a thickness less than half a micron while others permit a thickness of 5 microns. A replicate video disc, like the disc 28 of FIGS. 4 and 5, is adapted to be placed in direct contact with the master disc 29.

In addition to being durable, the surface layer 34 of the master disc 29 should preferably adhere tightly to the image bearing layer 32 in order to prevent separation between the two layers during use. Depending upon the materials chosen for the surface layer 34, a sub-layer (not shown) may be used between the surface layer 34 and the image bearing layer 32 to promote adhesion.

If the surface layer 34 is also compliant, dirt and dust (or other foreign objects) pressed between the master video disc and the replicate video disc during contact printing will become imbedded in the surface layer 34. While such a property may appear to be a disadvantage, such is not necessarily the case. For example, if the surface layer 34 can be stripped from the master video disc 29, and a fresh surface layer coated thereon in its place, the compliant surface layer 34 serves to "clean up" the contact printing operation, at least insofar as keeping such foreign objects from the replicate video discs.

It may further be desirable to use a material for the surface layer 34 which is conductive. As a result of its conductivity, such a surface layer 34 would not exhibit the electrostatic attraction to dust seen in some non-conductive materials.

The invention has been described in detail with particular reference to preferred embodiments thereof, but it will be understood that variations and modifications can be effected within the spirit and scope of the invention. For example, while the invention was described in connection with the replication of video discs, it will be apparent to those skilled in the art that the invention may be practiced in connection with other applications as well as general photographic contact printing, microcircuit manufacture, etc. Further, while the term video "disc" has been employed throughout the specification, it will be apparent to those skilled in the art that the present invention applies as well to a video "record", record being understood to encompass any shape, not just a disc shape, of video recording medium.

What is claimed is:

1. A method for producing a replicate record from a master record by contact printing, said master record including information recorded in the form of a distribution of transmissive apertures, at least some of which apertures have a cross-sectional dimension of about $1\mu m$ in size, said method comprising the steps of:

superposing said master record and a replicate record material, said replicate record material comprising a photosensitive material having a relatively high level of absorption to actinic radiation, which level of absorption decreases to a lower level during exposure to actinic radiation; and exposing said replicate record material through said distribution of transmissive apertures in said master record with radiation that is actinic to said replicate record material, thereby forming a replicate record of the information contained in said master record.

2. A method as claimed in claim 1 further including the step of developing said replicate record material after exposure to actinic radiation to increase the optical contrast of said replicated information.

3. A method for producing a replicate record from a master record by contact printing, said master record including information recorded in the form of a distribution of transmissive apertures, at least some of which apertures have a cross-sectional dimension of about $1\mu m$ in size, said method comprising the steps of:

superposing said master record and a diazotype replicate record material comprised of a photosensitive diazonium salt and a dye coupler; and exposing said replicate record material through said distribution of transmissive apertures in said master record with radiation that is actinic to said replicate record material, thereby forming a replicate record of the information contained in said master record.

4. A method as claimed in claim 3 further including the step of developing the exposed diazotype replicate material by contact with a chemical base.

5. A method for producing a replicate video record from a master video record by contact printing, said master video record including information recorded in the form of a distribution of transmissive apertures, at least some of which apertures have a cross-sectional dimension of about $1\mu m$ in size, said method comprising the steps of:

superposing said master video record and a diazotype replicate record material comprised of a photosensitive diazonium salt and a dye coupler; and exposing said diazotype replicate record material through said distribution of transmissive apertures in said master video record with radiation that is actinic to said diazotype replicate record material, thereby forming a replicate record of the video information contained in said master record.

6. A method as claimed in claim 5 further including the step of developing the exposed diazotype replicate record material by contact with a chemical base.

7. A method for producing a replicate video disc from a master video disc by contact printing, said master video disc including information recorded in the form of a distribution of at least a billion transmissive apertures, at least some of which apertures have a cross-sectional dimension of about $1\mu m$ in size, said method comprising the steps of:

superposing said master video record and a diazotype replicate record material comprised of a photosensitive diazonium salt and a dye coupler;

exposing said diazotype replicate record material through said distribution of transmissive apertures in said master video record with radiation that is actinic to said diazotype replicate record material, thereby to replicate said video information in said diazotype replicate record material; and developing the exposed diazotype replicate record material by contact with a chemical base to increase the contrast of replicated video information.

8. A process of producing a replicate record from a master record comprising the steps of:

contacting said master record, comprising a record of information in the form of a record of a distribution of radiation transmissive apertures, therein at least some of which apertures have a cross-sectional dimension of about 1μm in size, with said replicate record comprising a diazotype material having a photosensitive diazo compound and dye coupler containing layer, exposing said replicate record through said master record with radiation that is actinic for said diazo compound, and developing said replicate record to duplicate the information in the master record onto the replicate record in the form of a dye, wherein a reflective layer is placed adjacent said diazo compound containing layer.

* * * * *